No. 850,109. PATENTED APR. 9, 1907.
C. C. CLAWSON.
SPEED RECORDER.
APPLICATION FILED OCT. 1, 1906.

Witnesses
C. N. Walker
John E. Burch

Inventor
Clement C. Clawson
By Chas. J. Hedrick
his Attorney

No. 850,109. PATENTED APR. 9, 1907.
C. C. CLAWSON.
SPEED RECORDER.
APPLICATION FILED OCT. 1, 1906.

Witnesses
C. H. Walker.
John E. Burch.

Inventor.
Clement C. Clawson
by Chas. J. Hedrick his Attorney

No. 850,109.  
PATENTED APR. 9, 1907.

C. C. CLAWSON.  
SPEED RECORDER.  
APPLICATION FILED OCT. 1, 1906.

Witnesses  
Inventor  
Clement C. Clawson  
by Chas. J. Hedrick  
his Attorney

UNITED STATES PATENT OFFICE.

CLEMENT C. CLAWSON, OF FLAGTOWN, NEW JERSEY.

SPEED-RECORDER.

No. 850,109.　　　　Specification of Letters Patent.　　　　Patented April 9, 1907.

Application filed October 1, 1906. Serial No. 336,923.

*To all whom it may concern:*

Be it known that I, CLEMENT C. CLAWSON, a citizen of the United States, residing at Flagtown, in the county of Somerset and State of New Jersey, have invented certain new and useful Improvements in Speed-Recorders and Analogous Apparatus, of which the following is a specification.

This invention relates more particularly to apparatus for automatically noting on a record-blank the speed at which an automobile bearing the speed-recorder is traveling, the speed being noted either directly as such or indirectly as distance traveled and time occupied in traveling the same, or it may be noted in both modes. When the speed is noted directly as such, either the distance traveled at each speed or the time during which each speed is maintained may be noted. When speed is noted both directly as such and indirectly in terms of distance and time, the distance traveled and the time of traveling at each speed would naturally both of them be noted. Apparatus similar to that for recording the speed of an automobile can be used to record the speed of other machinery.

The invention also relates to apparatus analogous to speed-recorders in that they make a record (or a succession of records) on an appropriate blank by means of an appropriate marking instrument and comprise means for supporting such blank and instrument and for suitably moving one or other, or both, of them.

In the present invention in its most complete form the recorder consists of means for supporting and moving a record-blank in the form of a tape in front of a reservoir-pen which bears constantly against the tape and is actuated in the plane of the face of the tape at place of marking transversely to the direction of its motion; but modifications can be made within the spirit of the invention.
Parts of the invention, moreover, can be used separately, and each part, improvement, or combination included in the invention is intended to be secured for all the uses for which it can, with or without modification, be employed. Recorders have been devised heretofore with record-blanks in other forms (as disks or cylinders, for example) as well as in the form of tapes, and some of them have used other forms of marking instruments (as pencils, styluses, punches, perforating-points, or type, for example) as well as those in the form of pens and have had the marking instrument act upon the record-blank otherwise (at intervals, for example) as well as in a continuous manner and have had the marking instrument actuated in other directions (as at right angles to the face of record-blank at place of marking) as well as in the plane of said face transverse to the direction of the blank's motion. They have also had the means for supporting the record-blank and marking instrument and for imparting motion thereto arranged with reference to the purpose for which the recorder is designed. Thus where a record of something besides speed has been desired (as variations of temperature or telegraphic or other signals, for example) motions have been imparted to the record-blank and the marking instrument, respectively, from devices the position of one at least of which is dependent upon the thing to be recorded. Where speed is directly or indirectly to be recorded, the requisite motions are derived, respectively, from devices whose positions are dependent one upon a time and the other upon a distance element; and where the positions of one of said devices are dependent (like a centrifugal governor, for example) upon speed the positions of the other may be dependent either upon a time or a distance element, because speed combines elements of both time and distance.

The invention is believed to be applicable in some one or more of its parts to very many, at least, of the forms of recorders heretofore devised, as well as to that form which, as indicated above, embodies the invention most completely. It will suffice, however, to exhibit it as thus embodied and to show some of the variations which can be made, while preserving what is indicated above as the most complete form of the present invention. Thus means will be shown for moving the record-blank in one variety by a timepiece and in another by a device whose movement represents distance, while means for actuating the marking instrument will be illustrated in three variations, in one of which it is actuated by a device whose movement represents distance, in the second of which it is actuated by a timepiece, and in the third of which it is actuated by a centrifugal governor. Should it be desired to record the speed both directly and indirectly, one way to accomplish it would be to use two marking instruments in connection with means for supporting and moving a record blank or blanks, which means would, in part at least, be the same for both instruments, one instrument being actuated by a speed-indicator (as a centrifugal governor, for example, or other known or suitable speed-indicator) and the other instrument by a timepiece (in case the movement of the record-blank should depend upon a device whose movement represents distance) or by a distance device, (in case the movement of the record-blank should depend upon a timepiece.) Inasmuch as each of these modes of moving a record-blank will be illustrated, as well as each of the three modes of actuating a marking instrument—namely, by a speed-indicator, by a distance device, and by a timepiece—it will only require an arrangement and combination in the manner just referred to of what is thus illustrated in order to have two styles of apparatus for recording speed both directly as such and indirectly in terms of time and distance—namely, one style in which the marking instruments shall be actuated, one by a speed-indicator and the other by a distance device, and the other style in which they shall be operated, one marking instrument by a speed-indicator and the other by a timepiece.

The invention includes all and singular the new, useful, and original parts, improvements, and combinations herein set forth.

In the accompanying drawings.

The frame of the apparatus consists, as shown, of a box having ends $a$, back $b$, bottom $c$, cover $d$, and division-plate $e$, this last being parallel with the bottom. The ends $a$ are provided with upright flanges $f$, to which the back $b$ is fastened, with horizontal flanges $g$, to which the bottom $c$ is fastened, and with horizontal flanges $h$, to which the division-plate $e$ is fastened. The cover $d$ is hinged at $j$ and is provided with a lock $i$. The flexible shaft $k$, which transmits motion to the speed-recorder, terminates, as shown, in a spindle $l$, on which the gears $m$ $n$ and collar $o$ are secured by set-screws. The spindle is inserted through a journal-bearing in the lug $p$ on the adjacent flange $g$ and into a similar bearing in the lug $q$ on the adjacent flange $h$.

The gear $n$ communicates motion to gear $r$, forming part of a counter $s$ of known or of any suitable construction secured on the adjacent end $a$ of the box outside of the latter.

Figure 1:
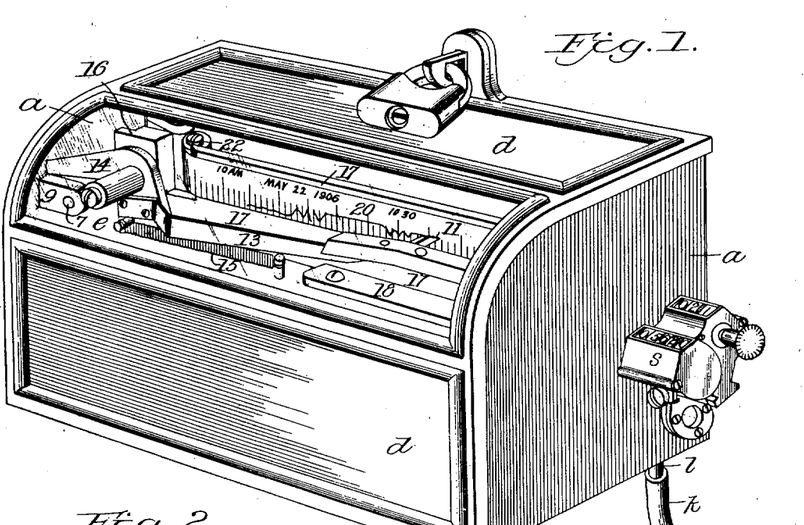
Figure 1 is a perspective view of a speed-recorder in accordance with the invention.
Figure 2:
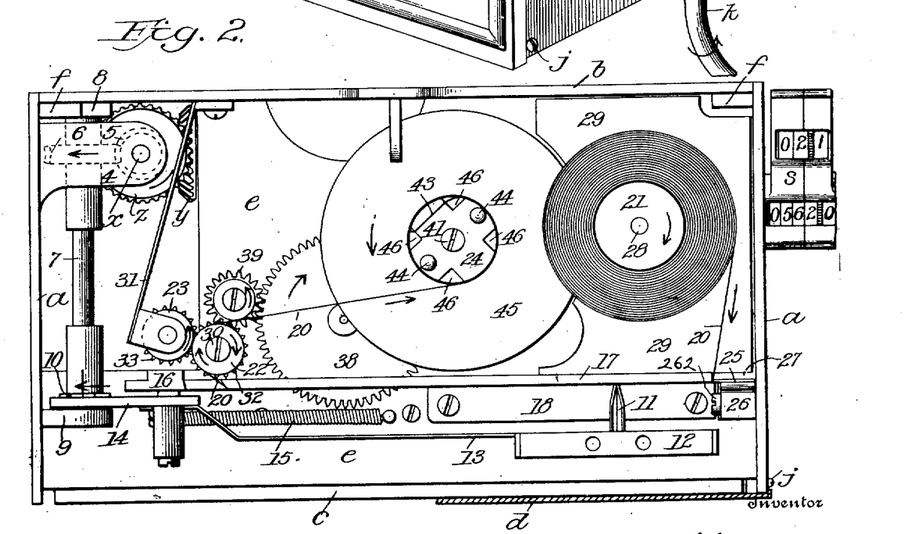
Fig. 2 is a plan view of the same with the cover, except a small portion, removed.
Figure 3:
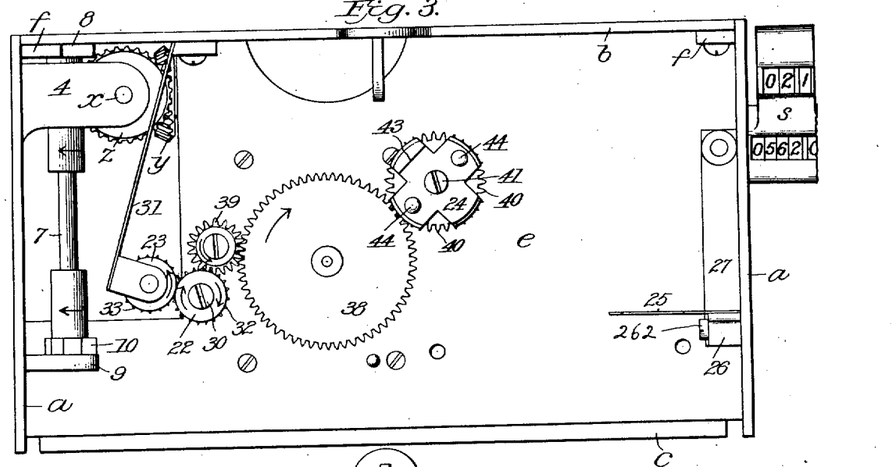
Fig. 3 is a plan view of the same with cover and some additional parts removed.
Figure 4:
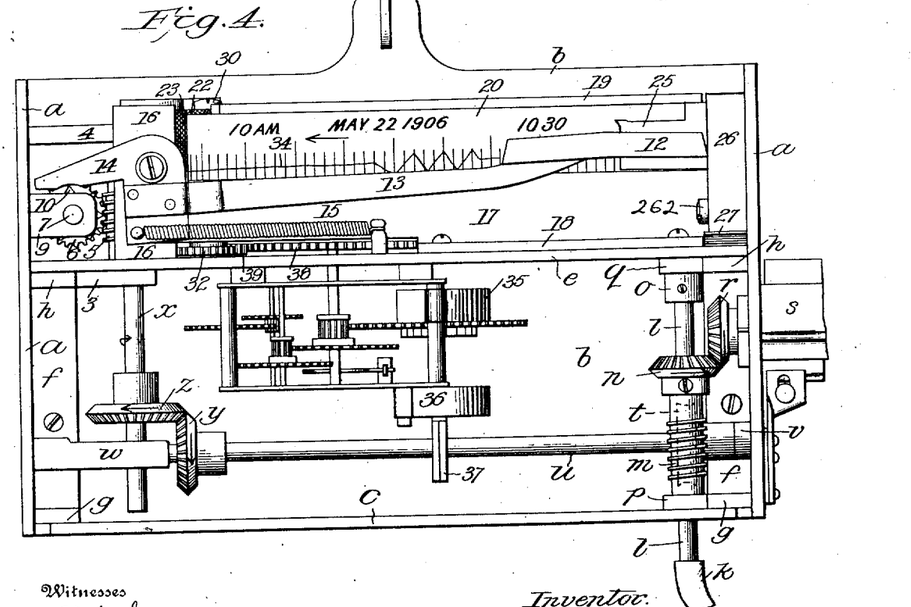
Fig. 4 is a front view of the same recorder with cover removed.
Figure 5:
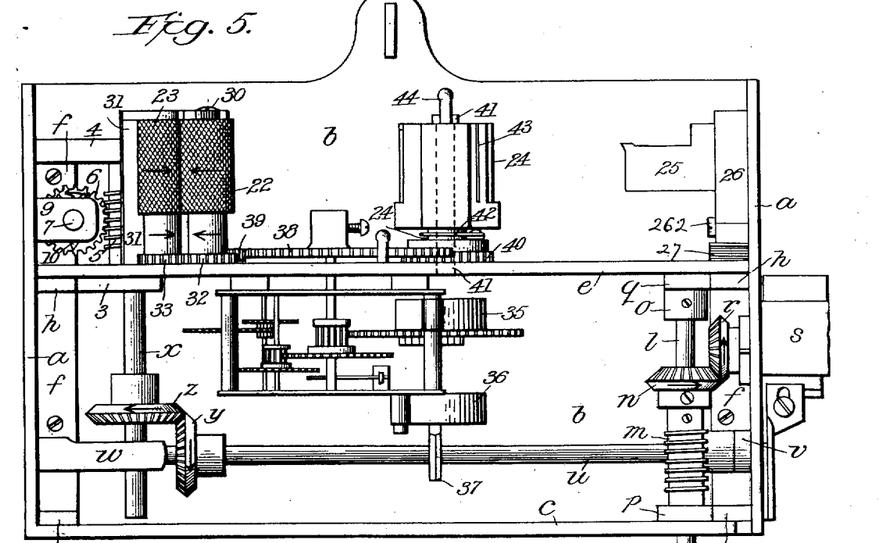
Fig. 5 is a similar view with cover and some additional parts removed.
Figure 6:
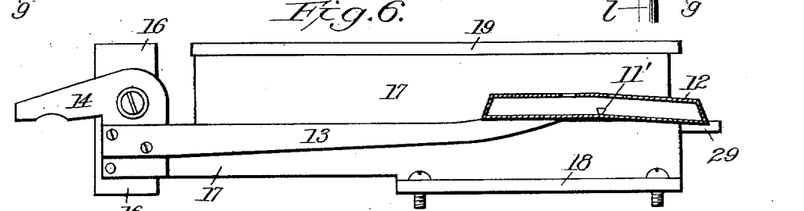
Fig. 6 is a front view, partly in vertical section, of all but one of the parts shown in Figs. 2 and 4 and omitted from Figs. 3 and 5.
Figure 7:
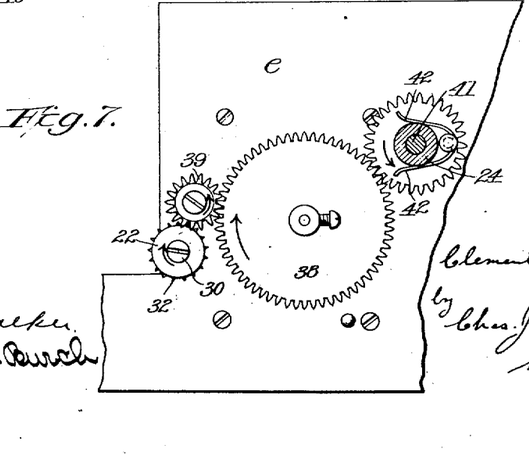
Fig. 7 is a view of part of the same recorder, partly in plan and partly in horizontal section.

As shown in Figs. 1–7, the worm-gear $m$ communicates motion through an intermeshing gear $t$ (indicated in dotted lines in Fig. 4) to the horizontal shaft $u$, which is journaled in lugs $v$ $w$ on the ends $a$ of the box and which communicates motion to the upright shaft $x$ through the bevel-gears $y$ and $z$. The shaft $x$ is journaled in lugs $w$ 3 4 on the adjacent end $a$ of the box. A worm-gear 5 communicates motion through an intermeshing gear 6, Figs. 2, 4, and 5, to the horizontal shaft 7, which is journaled in lugs 8 and 9 on the adjacent end $a$ of the box and which at its outer end carries the star-wheel 10 for imparting a reciprocating movement to the marking instrument 11 of the recorder. As shown, this instrument is in the form of a pen 11, Figs. 1 and 2, provided with an ink-reservoir 12, and it is mounted on a leaf-spring 13, which constitutes the long arm of a lever whose shorter arm 14 is acted upon by the star-wheel. The marking instrument 11 is thus actuated by a distance device 10, or, in other words, by a device 10 whose movement represents the distance to be recorded, for the turns of said device or star-wheel 10 are in a fixed proportion to the revolutions of shaft $k$, and by consequence its movement represents the distance through which a selected point on the therewith-connected part of the automobile or other machine travels. As a speed-recorder for automobiles the pen 11 would make a complete up-and-down stroke for such distance as might be thought best—say a mile or a half or a quarter mile, for example—traveled by the automobile.

The pen 11 may be of any known or suitable construction and is shown as consisting of a metal trough beveled on top (see Fig. 2) at its inner end, (or, in other words, at its point.) It is supplied with ink which adheres to the metal (brass) sufficiently to be drawn off slowly by adhesion to the surface of a moving sheet or tape of paper on which a record is to be made. Such ink is a known commercial article.

At its outer end the pen is connected with the reservoir 12, having one or more ink-spaces below the level of the pen, from which spaces the ink is raised to feed the pen. As shown, the pen is placed in the middle of the reservoir between two intercommunicating ink-spaces whose bottoms meet like the sides of an inverted V, and the pen communicates with the interior of the reservoir through the opening 11′, Fig. 6, at about the apex of the V. As the pen is raised and lowered by star-wheel 10 and spring 15 the reservoir 12 is tilted in consequence of its movement in the arc of a circle with the fulcrum of lever 13 14 as a center; but the bottom of each ink-space at one time or another is below the level of the pen-feed, or, in other words, below the level to which the ink must be raised in order to supply the pen. With the feed-opening 11' in a vertical wall of the reservoir, as shown, such level must be at least as high as the bottom of the opening 11'. By the tilting of the reservoir 12 the ink-space on each side of the opening 11' is alternately raised and lowered with reference to the other, and the ink consequently flows from one ink-space to the other past the pen-feed opening 11'. Enough ink passes through the opening 11' to keep the pen 11 supplied. On an automobile the jolting to which the recorder is subjected throws up the ink from the lower-level ink-spaces and so supplies the pen with ink, this action being independent of the movement of the pen-reservoir by the machinery of the recorder.

There is a special advantage in having ink-spaces on opposite sides of the pen, in that the ink to supply the pen may flow from one of them to the other, and there will thus be a smaller rising at the pen-feed opening 11'. This advantage would accrue irrespective of the inverted-V shape of the reservoir-bottom, since with two spaces of any shape the tilting or jolting of the reservoir (suitably supplied with ink) might cause the ink to flow from one space to the other. It would also to a certain extent accrue irrespective of the position of both spaces below the level of the pen-feed, since the ink might spread into a space whose bottom should not be below said level. The broad advantages of a lower-level reservoir, moreover, are not dependent upon having ink-spaces on opposite sides of the pen nor on having more than one ink-space.

The lever 13 14 is fulcrumed on the post 16, which is united to an upright plate 17, and this latter is provided with a flange 18, by which said plate 17 and post 16 are secured to the division-plate $e$ of the box. The upright plate 17 on its outer face, below the flange 19, affords a shallow recess for receiving the tape 20, on which last the record is made. The tape is drawn against the face of plate 17 by the tape-holding and tape-feeding means, which are best in the form shown, and in this form consist of a supply-spool 21, a pair of feed-rollers 22 23, and a receiving-reel 24 for the marked tape. A spring-held presser 25 is also best employed to hold the tape 20 against the face of plate 17. It is fastened on an arm 26, which is pivotally mounted on the end $a$ of the box by means of journal-pin 262 and which when in an upright position is acted upon by the leaf-spring 27 in the direction to hold the presser against the tape. To facilitate the insertion and withdrawal of the tape 20, the arm 26, with the presser 25, can be turned down, the spring 27 then tending to hold it out of the way in consequence of the extremity of the arm 26 acted upon by the spring passing from a position in front of to one behind the pivot of arm 26. The elasticity of the pen-supporting arm 13 allows the pen and its reservoir to be withdrawn out of the path of the presser when desired.

The supply-spool 21 is placed loose about a spindle 28 on the horizontal plate 29, which is fastened to and supported by the plate 17.

The feed-rollers 22 23 best have roughened surfaces formed integral in the rollers—say by pressure against a file or rough-surfaced die—in order to nip the tape more firmly. One roller 22 is mounted on a stationary stud 30, screwed fast at its lower end in the division-plate $e$. The other roller 23 is carried by one end of a spring-plate 31, whose other end is fastened to the back $b$ of the box. By mounting one of the rollers on a spring-plate it can be moved aside to facilitate insertion of the tape between the feed-rollers and its removal therefrom. It might suffice to allow one of the feed-rollers to revolve by friction; but it is considered preferable to rotate both of them positively, and they are therefore shown as provided with intermeshing gears 32 33.

In the speed-recorder of Figs. 1–7 the feed-rollers 22 23 are rotated by a clockwork, while, as before stated, the pen 11 is moved up and down by the revolutions of shaft $k$, and consequently in this variety of the new or improved recorder the pen 11 traces on the tape 20 a straight longitudinal line when the shaft $k$ is stationary and a zigzag line when the shaft $k$ revolves. A part straight and part zigzag line, such as might be formed, is indicated at 34 in Fig. 4. The higher the speed of the shaft $k$ the more nearly vertical do the elements of line 34 become. By suitable adaptation of gearing each stroke of pen 11 up or down can represent any desired distance traveled, and the tape can be moved at any desired speed; but assuming that each single pen-stroke represents a quarter of a mile and that one space between the vertical division-lines on tape 20 passes the pen each minute, then if each single pen-stroke takes place precisely in one of said spaces (or in an equal distance) the speed recorded will be a quarter-mile a minute or fifteen miles an hour. Should this speed be doubled, each single pen-stroke will occupy only half a minute space, the angle which each pen-stroke will make with the vertical being only about half as large as that made by the former pen-strokes. The surface on the lever-arm 14, against which the star-wheel 10 acts, is best shaped to make the slanting up-and-down lines drawn by the pen straight (or as near so as practicable) when the shaft $k$ is revolved at uniform speed. Whenever the speed changes, a change in the vertical angle of the strokes naturally takes place at the time when the change in speed occurs. Apart, however, from the straightness of the up-and-down lines drawn by the pen the horizontal distances between the ends of said lines (or, in other words, between the points of reversal of the pen's movement) will be uniform with uniform speed of shaft $k$ and will serve to show the time within which each quarter-mile (or whatever the distance represented by each pen-stroke may be) is traveled. By dating the tape as shown the speed at any hour and minute of a given date can be recorded in a form capable of preservation. By counting the number of reversals of the pen's movement the distance traveled in any period of time can be ascertained. For rotating the feed-rollers 22 23 an ordinary clockwork is shown supported under and by the division-plate $e$, with the arbors of the clockwork in a vertical position. This clockwork is shown with two springs 35 36 on the same winding-arbor 37, because this clockwork was originally made for an ordinary timepiece, and the spring 36 had to be added to supply the power to feed the tape; but it is not considered advantageous to have more than one spring. The minute-arbor of the clockwork is extended through the division-plate $e$ and carries the gear-wheel 38, which drives the feed-roller 22 through the intermediary of an idler 39. It also serves to revolve the reel 24 by intermeshing with the gear 40, Figs. 3 and 5, having a friction connection with the reel 24. The journal-pin 41 for both the gear 40 and the reel 24 is formed by a shouldered screw tapped into the division-plate $e$, as indicated in dotted lines in Fig. 5. The gear 40 carries a forked spring 42, Figs. 5 and 7, which embraces the hub of reel 24 and turns it by friction. The feeding of the tape is effected by the feed-rollers 22 23. The reel 24 merely winds up the tape as fast as it is fed to it by said rollers. The gearing is so proportioned that it tends to revolve the reel 24 at a greater peripheral speed than that of the rollers 22 23, so as to keep the tape between said rollers and the reel 24 under the slight tension afforded by the friction of spring 42. The reel 24 is best made with a slit 43 to receive the end of the tape. It is also shown as provided with pins 44 for turning it by hand when desired—as, for example, in inserting a tape. To facilitate the removal of the tape from the reel, the latter has notches in its periphery, Figs. 2 and 3, and is provided with a stripper-plate 45, with projections 46 into the notches in the reel 24. By taking hold of the stripper-plate at its edges and raising it the roll of tape on the reel can be pushed off bodily.

Figure 8:
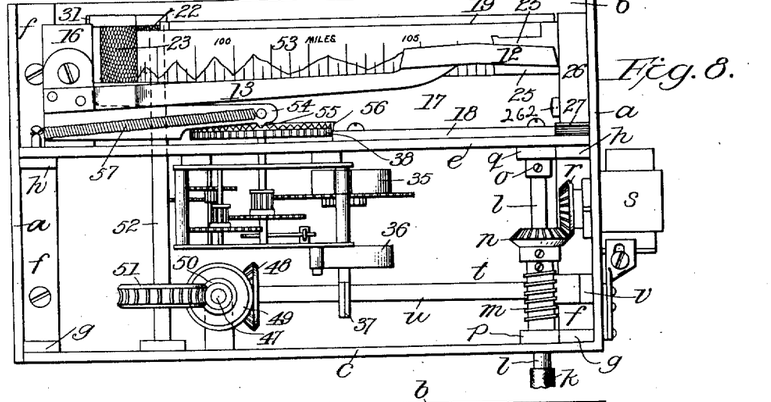
Fig. 8 is a front view of another variety of the same general form of speed-recorder, also within the invention.

In the variety of the new or improved speed-recorder shown in Fig. 8 the feed-rollers 22 23 are revolved by connection with the shaft $k$ and the recording-pen is moved up and down by the clockwork. The horizontal shaft $u$, driven (as mentioned above) from the shaft $k$ through worm-gears $m$ $t$, drives the horizontal shaft 47 through the bevel-gears 48 49, and the shaft 47 communicates motion through worm-gears 50 51 to the upright shaft 52, which carries the feed-roller 22 on its upper end. The feed-roller 23 is supported and operated as before described. The tape-supporting means are as before described; but the vertical divisions of tape 53 instead of being representative of time are representative of distance. The recording-pen, with its reservoir 12, is mounted on a leaf-spring 13, which constitutes the long arm of a lever fulcrumed on post 16, as before described. In Fig. 8, however, the short arm 54 of this lever is arranged to be lifted in equal periods of time—say once a minute or as often as preferred. It has a projection 55, which overlies a crown of teeth 56 on the gear-wheel 38 and which is kept in contact therewith by the spiral tension-spring 57. As each tooth of the crown 56 passes under and in contact with the projection 55 it raises the lever-arms 54 13 and the recording-pen and then allows the same to descend. Thus while the shaft $k$ and feed-rollers 22 23 are turning the tape 53 moves at corresponding speed and the pen makes a zigzag line on the tape, the strokes of which line more nearly approach the vertical the slower the speed. When the shaft $k$ stops, the recording-pen moves up and down in a vertical (slightly curved) path. Assuming that the pen makes a single stroke up or down each half-minute, then under this assumption each reversal of its motion will take place when the tape 53 has moved a distance representing that traveled in half a minute. By counting the number of reversals the time occupied (stops excluded) in traveling any particular distance can be ascertained. Stoppages will also be indicated, but not their duration.

Figure 9:
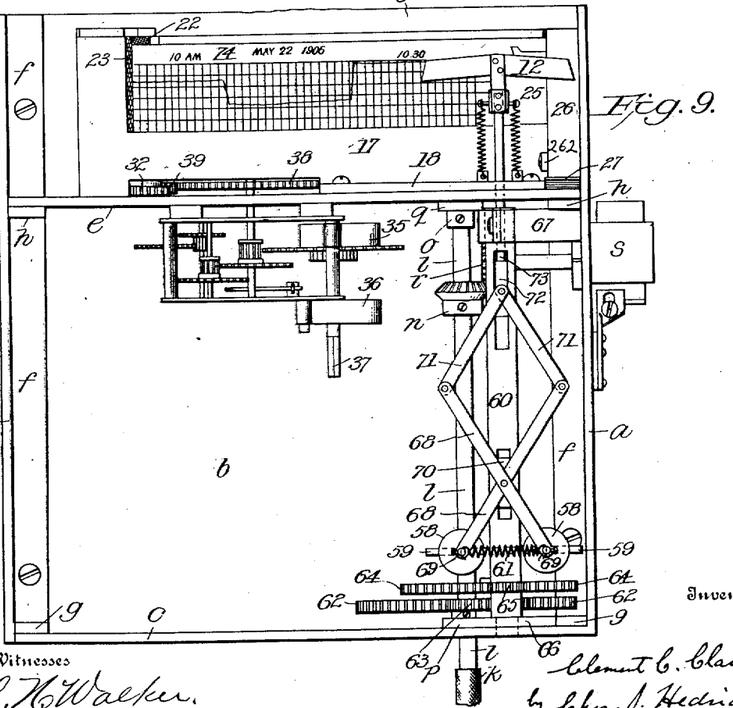
Fig. 9 is a similar view of a third variety, likewise within the invention.

In the variety of the new or improved speed-recorder shown in Fig. 9 the recording-pen is operated by a centrifugal governor. As shown, the governor-balls 58 are mounted loosely on arms 59 of the shaft 60, which arms restrain said balls against transverse movement, so that when exposed to jolts and lurches there is no tendency to force the balls toward or away from each other, because the only motions permitted by the arms are those of separation and approach, and in such motions the effect of a jolt or lurch on one ball is counteracted by its opposing effect on the other ball. Springs 61 tend to draw the balls 58 inward against the action of the centrifugal force. The shaft 60 is shown as being revolved by the gear 62 on spindle *l* of shaft *k* through the intermediary of the pinion 63 intermeshing with the gear 62 and the gear 64 turning with pinion 63 and intermeshing with the pinion 65 on the shaft 60. This last is shown as having a step-bearing in the lug 66 on the adjacent box-head *a* and a capped side bearing near its upper end in the lug 67 on the same head *a*. The motion could be conveyed to the marking instrument from governor-balls by other devices; but, as shown, lazy-tongs are used for the purpose. They are believed to have special advantages. The crossed lever-arms 68 of the lazy-tongs are pivotally connected at their lower ends with the governor-balls, preferably by the same pins 69 to which the ends of springs 61 are attached. At their crossing they are pivoted on the slide 70, which is movable vertically in a guideway in the shaft 60. At their upper ends they are pivotally connected with the lower ends of links 71, also forming part of the lazy-tongs. The upper ends of the links 71 are pivoted on the slide 72, movable vertically in a guideway in the shaft 60. The pin 73 rests upon the slide 72, and at its upper end it carries the marking instrument with reservoir 12 through the medium of a leaf-spring 74. It is held down by the spiral tension-springs 75. The pin 73 pushes the pen up when the balls approach each other and raise the slide 72, and the springs 75 pull it down when the balls separate and lower the slide 72. The tape 76 can either be provided with time divisions and be fed by a clockwork, as is the tape 20 of Figs. 1, 2, and 4, or it can be provided with distance divisions and be fed by connection with the shaft *k*, as is the tape 53 of Fig. 8. As shown in Fig. 9, it is provided with vertical time divisions and the feed-rollers 22, 23 are driven by clockwork. The tape 76 is provided with longitudinal lines to enable the speed-recorder to be more easily perceived. Thus each horizontal line counting from top downward may represent an acceleration of five miles an hour or whatever acceleration it may be preferred to indicate, the governor being adjusted to cause the recording-pen to move through corresponding vertical intervals as the speed of the shaft *k* varies.

The tapes 20 and 76 each of them record data showing the day, hour, and minute at which each mile was passed over, as well as the speed during each mile and the total number of miles. The tape 53 records the speed during each mile and the total number of miles; but the time of day at which each mile passed over can be ascertained only in case the time of starting or stopping should be noted otherwise.

In Fig. 9 the reservoir 12 is not tilted by the machinery; but reliance is had upon movements from outside (as upon the jolting of the recorder when carried by an automobile) to raise the ink to the level of the pen-feed. It is evident, however, that a reservoir arranged to be tilted by machinery forming part of the recorder, as well as one not so arranged, could be actuated either by a centrifugal governor—that of Fig. 9, for example—or by a timepiece, as in Fig. 8, or by a distance device, as in Figs. 1–7. The pen 11 and reservoir 12, mounted on a leaf-spring 13, which should constitute the arm of a lever, as in Fig. 8 and also in Figs. 1–7, could, for example, be actuated by a pin 73, which should be controlled by a centrifugal governor, as in Fig. 9, and in such case the spring 13, reservoir 12, and pin 73 could be depressed by a spiral tension-spring arranged as shown for the spring 57 of Fig. 8.

The cover *d*, which constitutes both the top and front of the box *a b c d* and which, as mentioned above, is hinged at *j* to the body of said box, is best provided with a curved glass panel 77, Fig. 1, to allow the record on the tape to be seen.

The operation of each variety shown of the new or improved recorder can be understood from the preceding description; but a brief recapitulation may not be amiss. In all of them as the tape is unwound from spool 21 by the pull of the rollers 22 23 it passes along the slightly-recessed face of plate 17 and is marked with a line traced by the recording-pen 11, Fig. 2. Referring to Figs. 1–7, when the shaft *k* is revolved the pen 11 moves up and down across the tape 20, making thereon a zigzag line. Each reversal takes place when the shaft *k* has made a predetermined number of revolutions, and it thus indicates a certain distance traveled. The longitudinal space on the tape 20 between reversals shows the time occupied in traveling said distance, and thus indirectly gives the speed. The tape 20 being printed with the days and the hours and minutes of each day, the distance traveled during any day or part of a day can be ascertained by counting the reversals during the corresponding space on the tape 20.

Referring to Fig. 8, the tape 53 is moved by rollers which are actuated from the shaft *k*. For a given number of revolutions of shaft *k* (representing a certain distance traveled) the tape 53 is fed a predetermined distance, and the recording-pen attached to reservoir 12 traces a zigzag line, each reversal of which takes place after a definite interval of time. Thus the longitudinal distance traced on tape 53 between reversals shows the distance traveled in a unit time interval, and consequently gives the speed. To ascertain the distance traveled during a particular day or part of a day, it is necesssary to make a separate note of the time of each start or stop. If the start should all be known, the number of reversals in the zigzag line will enable the times of stopping to be ascertained by reckoning forward, or if the stops are known reckoning backward will give the times of starting, and the time of traveling any intermediate distance can be similarly reckoned out.

Referring to Fig. 9, the tape 76 is fed by clockwork-actuated feed-rollers and is marked by a straight line except when changes of speed occur, this effect being due to the adjustment of pen 11 and reservoir 12 by a governor, whose balls 58 remain at the same distance from the center when the speed is uniform and separate from or approach toward each other when the speed increases or diminishes. The speed at each movement is given directly, also the time interval during which each speed continues, so that the distance traveled during any day or part of a day can be ascertained.

In consequence of official requirement of division the recording-pen, which is believed to be new in and of itself and which was originally claimed herein irrespective of other parts, is made the subject of my application, Serial No. 362,704, which was filed on March 16, 1907, as a division and continuation hereof.

I claim as my invention or discovery—

1. A recorder which consists of blank-supporting means, a marking instrument, means for supporting this latter, and means for causing the relative positions of the record-blank and the marking instrument to be shifted in order that fresh surfaces of the blank may be presented to the marking instrument, the said blank-supporting means being arranged to support a blank in the form of a tape and including an elongated upright tape-supporting plate, a tape-presser at one end of said plate and in front of the same, a spool-support located behind said plate, and a tape-reel located behind said plate at one side of the spool-support, substantially as described.

2. A recorder which consists of blank-supporting means, a marking instrument, means for supporting this latter, and means for causing the relative positions of the record-blank and the marking instrument to be shifted in order that fresh surfaces of the blank may be presented to the marking instrument, the said blank-supporting means being arranged to support a blank in the form of a tape and including a tape-supporting plate which is provided at its lower edge with a flange and is thereby detachably connected with the frame of the recorder and also including a spool-support carried by said plate so as to be capable of attachment and removal therewith, substantially as described.

3. A recorder which consists of blank-supporting means, a marking instrument, means for supporting this latter, and means for causing the relative positions of the record-blank and the marking instrument to be shifted in order that fresh surfaces of the blank may be presented to the marking instrument, the said blank-supporting means being arranged to support a blank in the form of a tape and including a tape-supporting plate detachably connected with the frame of the recorder, a spool-support carried by said plate so as to be capable of attachment and removal therewith, and a tape-presser mounted upon a journal-pin independent of said plate and having a spring underlying the plane of said spool-support behind said tape-supporting plate, substantially as described.

4. A recorder which consists of blank-supporting means, a marking instrument, means for supporting this latter, and means for causing the relative positions of the record-blank and the marking instrument to be shifted in order that fresh surfaces of the blank may be presented to the marking instrument, the said blank-supporting means being arranged to support a blank in the form of a tape and including a tape-supporting plate and a spring-presser, which latter has a hinged carrier and a spring acting on said carrier to press it toward the plate or to hold it away from the same, according to the position of the carrier, substantially as described.

5. A recorder which consists of blank-supporting means, a marking instrument, means for supporting this latter, and means for causing the relative positions of the record-blank and marking instrument to be shifted in order that fresh surfaces of the blank may be presented to the marking instrument, which recorder includes as its blank-supporting means an elongated upright plate for supporting a record-blank in the form of a tape, a presser for holding such blank against the face of the plate at one end thereof, and a spool-support and a reel located side by side behind and in proximity to said plate, this last being detachably connected by a foot-flange with the frame of the apparatus and carrying said spool-support, and said presser being mounted on a journal-pin independent of said plate and being provided with a spring which extends back of said plate below the plane of said spool-support and acts upon the presser in such manner that the latter is thereby held against or away from said tape-supporting plate according to the position of the presser, substantially as described.

6. A recorder which consists of blank-supporting means, a marking instrument, means for supporting this latter, and means for causing the relative positions of the record-blank and the marking instrument to be shifted in order that fresh surfaces of the blank may be presented to the marking instrument, the said blank-supporting means being arranged to support a blank in the form of a tape and including a tape-reel and a revolving gear which are provided one of them with a hub and the other with a forked friction-spring bearing against the periphery of said hub on opposite sides of the same, substantially as described.

7. A recorder which consists of blank-supporting means, a marking instrument, means for supporting this latter, and means for causing the relative positions of the record-blank and the marking instrument to be shifted in order that fresh surfaces of the blank may be presented to the marking instrument, the said blank-supporting means being arranged to support a blank in the form of a tape and including a tape-reel and a stripper-plate, the latter movable endwise over the reel for stripping the tape record therefrom, substantially as described.

8. A recorder which consists of blank-supporting means, a marking instrument, means for supporting this latter, and means for causing the relative positions of the record-blank and the marking instrument to be shifted in order that fresh surfaces of the blank may be presented to the marking instrument, the said blank-supporting means being arranged to support a blank in the form of a tape and including a tape-reel and a stripper-plate, the latter mounted on and turning with the said tape-reel, substantially as described.

9. A recorder which consists of blank-supporting means, a marking instrument, means for supporting this latter, and means for causing the relative positions of the record-blank and the marking instrument to be shifted in order that fresh surfaces of the blank may be presented to the marking instrument, the said blank-supporting means being arranged to support a blank in the form of a tape and including a tape-reel and a stripper-plate, the tape-reel provided with recesses in its periphery and the latter with projections extending into the same, substantially as described.

10. A recorder which consists of blank-supporting means, a marking instrument, means for supporting this latter, and means for causing the relative positions of the record-blank and the marking instrument to be shifted in order that fresh surfaces of the blank may be presented to the marking instrument, the said marking instrument being in the form of a pen with a lower-level ink-reservoir for feeding ink therefrom to the pen through jolting or other movement bodily of the recorder, substantially as described.

11. A recorder which consists of blank-supporting means, a marking instrument, means for supporting this latter, and means for causing the relative positions of the record-blank and the marking instrument to be shifted in order that fresh surfaces of the blank may be presented to the marking instrument, the said marking instrument being in the form of a pen with a lower-level ink-reservoir, and the recorder including means movable within the recorder for raising the ink relatively to the pen in order to feed the latter, substantially as described.

12. A recorder which consists of blank-supporting means, a marking instrument, means for supporting this latter, and means for causing the relative positions of the record-blank and the marking instrument to be shifted in order that fresh surfaces of the blank may be presented to the marking instrument, the said marking instrument being in the form of a pen with lower-level reservoir, and the recorder including means for tilting the reservoir and thereby raising the ink therein relatively to the pen in order to feed the latter, substantially as described.

13. A recorder which consists of blank-supporting means, a marking instrument, means for supporting this latter, and means for causing the relative positions of the record-blank and the marking instrument to be shifted in order that fresh surfaces of the blank may be presented to the marking instrument, the said marking instrument being in the form of a pen with lower-level reservoir having ink-spaces on opposite sides of an intervening elevation under and in proximity to the pen feed-opening, substantially as described.

14. A recorder which consists of blank-supporting means, a marking instrument, means for supporting this latter, and means for causing the relative positions of the record-blank and the marking instrument to be shifted in order that fresh surfaces of the blank may be presented to the marking instrument, the said marking instrument being in the form of a pen with lower-level reservoir having ink-spaces which are located on opposite sides of the pen and whose bottoms meet in an angle like the sides of an inverted V, the pen feed-opening being at about the apex of the V, substantially as described.

15. A recorder which consists of blank-supporting means, a marking instrument, means for supporting this latter, and means for causing the relative positions of the record-blank and the marking instrument to be shifted in order that fresh surfaces of the blank may be presented to the marking instrument, the said marking instrument being in the form of a pen with lower-level ink-reservoir and being arranged to raise the ink in said reservoir to said pen through mechanical action as opposed to capillarity and cohesion, substantially as described.

16. A recorder which consists of blank-supporting means, a marking instrument, means for supporting this latter, and means for causing the relative positions of the record-blank and the marking instrument to be shifted in order that fresh surfaces of the blank may be presented to the marking instrument, the said marking instrument being in the form of a pen with lower-level ink-reservoir which has ink-spaces on opposite sides of an intervening elevation under and in proximity to the pen feed-opening, and the pen-supporting means including a lever-arm which moves in a vertical plane and on which the pen and its reservoir are mounted with the ink-spaces at different distances from the fulcrum of said lever-arm, substantially as described.

17. A recorder which consists of blank-supporting means, a marking instrument, means for supporting this latter, and means for shifting the relative positions of the blank and the marking instrument in order to present fresh surfaces for marking, the said blank-supporting means being arranged to support in an upright position a blank in the form of a tape, the said means for shifting the relative positions of the blank and the marking instrument including appliances for feeding the tape-blank in the direction of its length, the said means for supporting the marking instrument including a lever with horizontally-disposed arms of unequal length on opposite sides of the fulcrum, which lever vibrates transversely to the length of said tape-blank in a vertical plane parallel with the face of said blank and on the long arm of which lever the marking instrument is mounted, and the said recorder also including a star-wheel which turns in a vertical plane and acts upon the short arm of said lever, the star-wheel and the marking instrument being located at opposite ends of the recorder at nearly the same level, substantially as described.

18. A recorder which consists of a box divided by a horizontal division-plate, means located above said plate for supporting in an upright position a record-blank in the form of a tape and for feeding the same in the direction of its length, a clockwork located below said division-plate and provided with a vertical arbor which projects through the said division-plate and is operatively connected with the overlying blank-feeding means, a lever with horizontally-disposed arms of unequal length located above said division-plate on opposite sides of the fulcrum and movable transversely to the length of said tape-blank in a vertical plane parallel with the face of said blank, a marking instrument on the long arm of said lever, a star-wheel located above said plate and arranged to act on the short arm of said lever, an upright shaft which projects through said division-plate and is operatively connected with the overlying star-wheel, and gearing located below said division-plate and operatively connected with the upright shaft last mentioned for transmitting thereto the movement to be recorded, substantially as described.

19. A recorder which consists of blank-supporting means, a marking instrument, means for supporting this latter, and means for causing the relative positions of the record-blank and the marking instrument to be shifted in order that fresh surfaces of the blank may be presented to the marking instrument, the recorder including a box which incloses the recording appliances and which has a hinged cover forming both top and front of the box and provided with a curved transparent panel at the junction of said top and front, and the blank-supporting means arranged to support in an upright position at the front of the box and parallel thereto a blank in the form of a tape and to expose the marked blank to view behind said panel, substantially as described.

20. The combination with a driving-gear, a device driven thereby, and a forked friction-spring carried by one of said parts, the other of them being provided with a hub against the periphery of which the arms of said spring bear on opposite side of the hub, substantially as described.

21. The combination with a driving-gear, a reel driven thereby, and a forked friction-spring carried by one of said parts, the other of them being provided with a hub against the periphery of which the arms of said spring bear on opposite side of the hub, substantially as described.

In testimony whereof I have signed my name to this specification in the presence of two subscribing witnesses.

CLEMENT C. CLAWSON.

Witnesses:
 FRANK W. PIERCE,
 J. B. CORNELL.